United States Patent
Simon et al.

(10) Patent No.: US 6,318,342 B1
(45) Date of Patent: Nov. 20, 2001

(54) FUEL INJECTION VALVE AND PRESSURE SENSOR COMBINATION

(75) Inventors: Stefan Simon, Zaberfeld; Holger Krebs, Erdmannhausen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/485,966

(22) PCT Filed: Mar. 23, 1999

(86) PCT No.: PCT/DE99/00837

§ 371 Date: May 18, 2000

§ 102(e) Date: May 18, 2000

(87) PCT Pub. No.: WO99/67528

PCT Pub. Date: Dec. 29, 1999

(30) Foreign Application Priority Data

Jun. 19, 1998 (DE) .............................. 198 27 287

(51) Int. Cl.$^7$ .......................... F02M 51/00; G01M 15/00
(52) U.S. Cl. ........................................ 123/494; 73/119 A
(58) Field of Search .................... 123/494, 498, 123/478, 357; 73/119 A, DIG. 4, 706; 239/585.1–585.5

(56) References Cited

U.S. PATENT DOCUMENTS

| | | | | |
|---|---|---|---|---|
| 3,194,162 | * | 7/1965 | Williams | 123/498 |
| 3,589,345 | * | 6/1971 | Benson | 123/478 |
| 4,502,438 | * | 3/1985 | Yasuhara | 123/357 |
| 4,798,188 | * | 1/1989 | Ito et al. | 123/478 |
| 5,111,699 | * | 5/1992 | Walstra et al. | 73/754 |
| 5,127,378 | * | 7/1992 | Ito | 123/300 |
| 5,479,902 | * | 1/1996 | Wirbeleit | 123/498 |
| 6,148,842 | * | 11/2000 | Kappel et al. | 137/79 |
| 6,155,212 | * | 12/2000 | McAlister | 123/3 |

FOREIGN PATENT DOCUMENTS

| | | |
|---|---|---|
| 31 30 238 | 2/1983 | (DE) . |
| 43 06 073 | 6/1994 | (DE) . |
| 195 00 706 | 7/1996 | (DE) . |
| 196 22 651 | 12/1996 | (DE) . |
| 2 145 153 | 3/1985 | (GB) . |

\* cited by examiner

*Primary Examiner*—Carl S. Miller
(74) *Attorney, Agent, or Firm*—Kenyon & Kenyon

(57) ABSTRACT

A fuel injector-pressure sensor combination for fuel injection systems for direct injection of fuel into the combustion chamber of an internal combustion engine and for measurement of the pressure in the combustion chamber includes a piezoelectric or magnetostrictive element. The piezoelectric or magnetostrictive element is positively connected with a valve closer which interacts with a valve seat face to form a sealing seat. In addition, an electronic control and analysis circuit is provided which activates the piezoelectric or magnetostrictive element during a fuel injection phase in such a way that the valve closer activated by the piezoelectric or magnetostrictive element lifts off from the valve seat face and opens the seat. During a pressure measurement phase, the control and analysis circuit detects a pressure in the combustion chamber transmitted from the valve closer to the piezoelectric or magnetostrictive element and converted by the latter into an electric signal.

7 Claims, 1 Drawing Sheet

FUEL INJECTION VALVE AND PRESSURE SENSOR COMBINATION

BACKGROUND INFORMATION

The present invention relates to a fuel injector-pressure sensor combination for fuel injection systems for direct injection of fuel into the combustion chamber of an internal combustion engine and for measurement of the pressure in the combustion chamber.

A fuel injector having a piezoelectric actuator is known, for example, from German Published Patent Application No 195 00 706. In this known fuel injector, the piezoelectric or magnetostrictive actuator activates a power piston which acts upon a reciprocating piston via a hydraulic path transformer. The reciprocating piston has a positive connection with a valve closer provided at the injection opening via a valve needle. The piezoelectric or magnetostrictive actuator therefore has a non-positive connection to the valve closer via the hydraulic path transformer. If an appropriate electrical voltage is applied to the actuator, it expands and displaces the power piston correspondingly. Even a relatively slight displacement of the power piston is transformed by the hydraulic path transformer into a considerably greater displacement of the reciprocating piston so that the valve closer clears the injection opening, leaving it with an adequate cross-section.

A fuel injector of similar design is derived from German Patent No 43 06 073. A housing-side support of the actuator in a special spherical disk bearing in particular is known from this printed publication in order to cause the piezoelectric actuator to have complete contact with the plunger it is to act on if the actuator end surfaces are slightly non-parallel.

For various applications, it is desirable to detect the pressure prevailing in the combustion chamber via a suitable sensor. For this purpose, it has heretofore been customary to provide pressure sensors in the cylinder head of the internal combustion engine as individual components and to measure the combustion pressure in the combustion chambers of the engine in this manner. Since present-day internal combustion engines have multiple intake and exhaust valves per combustion chamber and also in the case of direct injection, a spark plug to ignite the fuel is also necessary in the combustion chamber of an internal combustion engine having spark ignition in addition to a fuel injector for direct injection of the fuel into the combustion chamber, the available installation space on the cylinder head is very limited. Since a separate bore in the cylinder head is required for each pressure sensor designed as individual components, the practical implementation of pressure measurement in injection systems with direct injection into the combustion chamber is difficult.

SUMMARY OF THE INVENTION

In contrast, the fuel injector-pressure sensor combination according to the present invention has the advantage that the fuel injection and pressure measurement are accomplished with one component that implements these functions jointly. At the same time, only one single cylinder bore is required to install the fuel injector-pressure sensor combination and not, as in previous devices, one cylinder bore for the fuel injector and one additional cylinder bore for the pressure sensor. Moreover, the fact that the pressure sensors are not required as an additional component makes a distinct reduction of production costs possible.

The method for operating a fuel injector-pressure sensor combination has the advantage that the fuel injector is activated and the pressure is detected by a single piezoelectric or magnetostrictive element that fulfills both of these functions. Since the metering of fuel and the detection of combustion pressure do not take place simultaneously but rather in staggered operating phases, the fuel can be metered and the combustion pressure measured with the same components in succession.

In an advantageous manner, each cylinder of the internal combustion engine may be checked for the presence of knock due, for example, to the presence of leaking valves or misfiring due, for example, to a defective spark plug. This can be converted into a warning signal for the driver of a motor vehicle in which the internal combustion engine equipped with the fuel injector-pressure sensor combination according to the present invention is installed.

DETAILED DESCRIPTION

Figure 1:
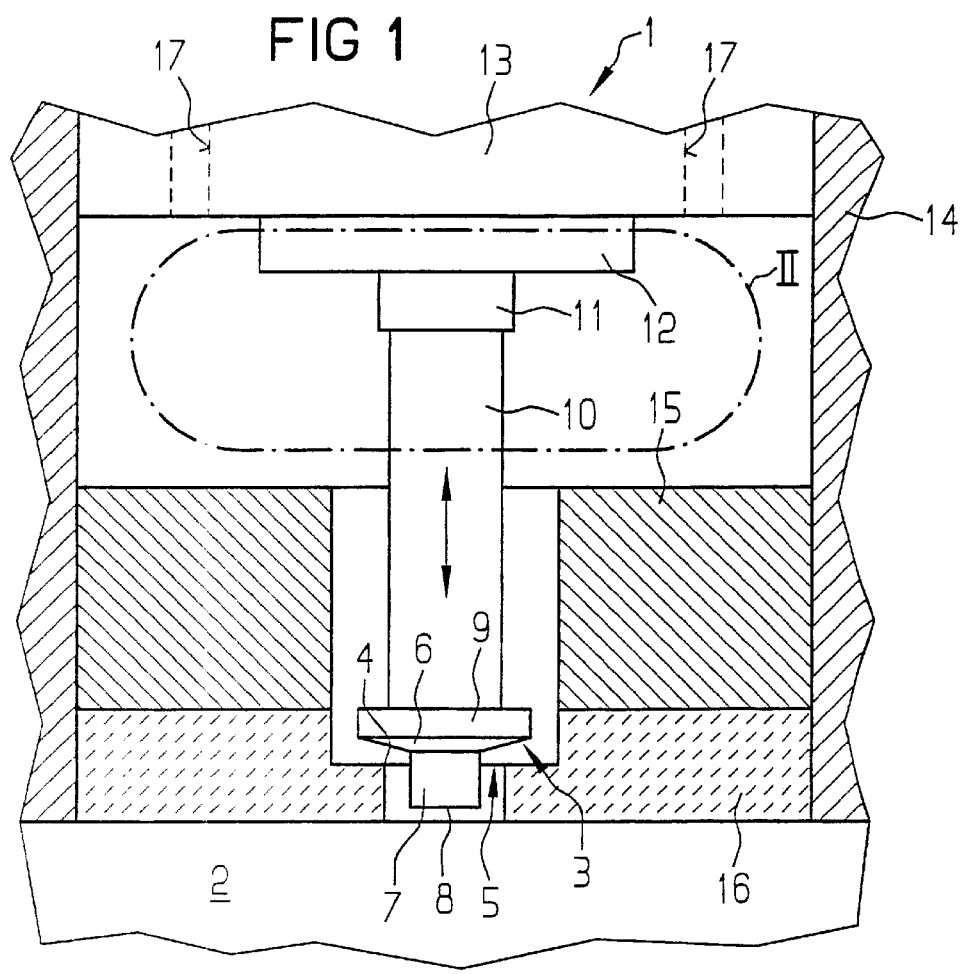
FIG. 1 shows a section through an exemplary embodiment of the fuel injector-pressure sensor combination according to the present invention.

The fuel injector-pressure sensor combination shown as an example in FIG. 1 for fuel injection systems for direct injection of fuel into the combustion chamber of an internal combustion engine and for the measurement of the pressure in the combustion chamber is suitable for both spark-ignition internal combustion engines whose operation is based on the combustion of an air-fuel mixture, in particular those that operate with gasoline as fuel as well as self-igniting internal combustion engines, in particular those that operate with diesel fuel.

The fuel injector-pressure sensor combination according to the present invention is identified with the reference numeral 1 and serves the purpose of direct fuel injection into a combustion chamber 2 of an internal combustion engine, which is not described in greater detail, as well as measurement of the pressure, the compression pressure in particular, in combustion chamber 2. Fuel injector-pressure sensor combination 1 includes a valve closer 3, which interacts with a valve seat face 4 forming a sealing seat 5. In the exemplary embodiment shown, valve closer 3 has a conical section 6 facing valve seat face 4, conical section 6 being adjoined by a cylindrical section 7 on the injection side.

Fuel injector-pressure sensor combination 1 shown in the drawing is shown in its opened state in which valve closer 3 is lifted off from valve seat face 4 and clears sealing seat 5. In the closed state of sealing seat 5, conical section 6 of valve closer 3 sits tightly against valve seat face 4 and injection-side, cylindrical section 7 of valve closer 3 protrudes slightly into combustion chamber 2. The injection-side face serves as pressure measurement surface 8 for the pressure measurement function.

Valve closer 3 gradually blends into a valve needle 10 via an upstream, cylindrical section 9, valve needle 10 transferring the stroke movement between valve closer 3 and a piezoelectric element 11. A magnetostrictive element may also be used in the same manner in place of a piezoelectric element 11.

The piezoelectric element includes a ceramic body with piezoelectric properties which, as is known, expands or contracts with the application of an electrical operating voltage as a function of the orientation of the piezoelectric crystal and conversely generates an electrical signal voltage with the application of pressure. Suitable piezoelectric materials are, for example, quartz, tourmaline, barium titanate ($BaTiO_3$) or special piezoceramics such as, for example, a lead(II) zirconate-lead titanate system ($PbZrO_3$-$PbTiO_3$). Preferably, an electronic control and analysis circuit 12 is located in the immediate vicinity of piezoelectric element 11. In the exemplary embodiment shown, control and analysis circuit 12 is mounted on a mounting plate 13 which is permanently joined to a housing 14 by welding, for example. A toroidal body 15 arranged on the injection side is permanently joined to housing 14 in a like manner, a ceramic disk 16 being mounted to toroidal body 15, the ceramic disk serving to thermally insulate fuel injector-pressure sensor combination 1 from combustion chamber 2 of the internal combustion engine and on which valve seat face 4 is formed. Ceramic disk 16 and toroidal body 15 together form a valve seat body, which may of course be formed in a completely different manner, of one piece of metal in particular. In order to make the passage of fuel possible, holes 17 are provided in mounting plate 13. Piezoelectric element 11 is preferably mounted on control and analysis circuit 12 which is formed as a hybrid circuit.

Figure 2:
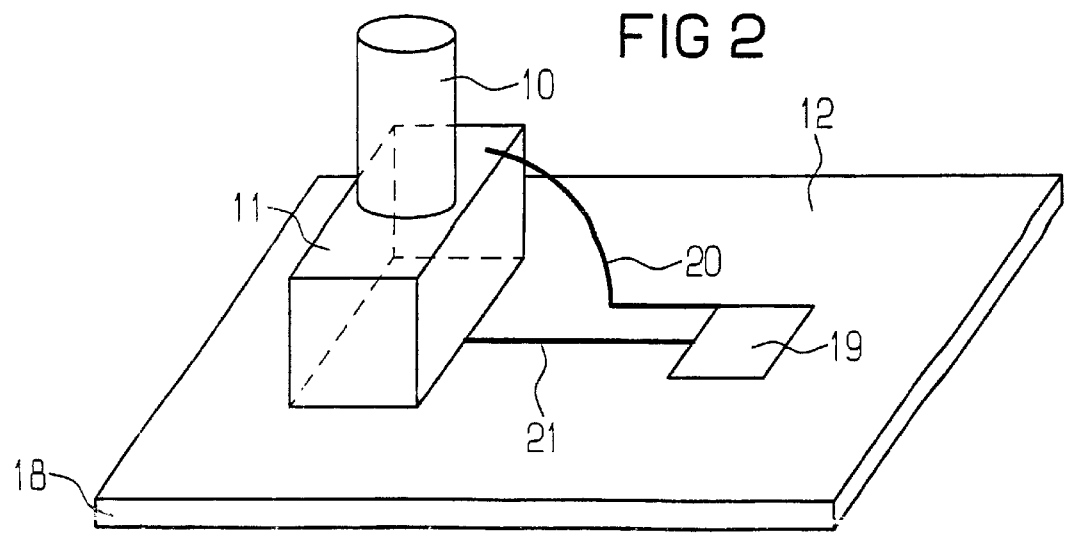
FIG. 2 shows detail II in FIG. 1 in a perspective representation with various components.

FIG. 2 shows a perspective representation of section II in FIG. 1, making it possible to recognize additional details.

Piezoelectric element 11 is preferably cemented or soldered to control and analysis circuit 12. Preferably, piezoelectric element 11 is made up of several piezoelectric disks stacked one on top of the other, the top and bottom of each of them being provided with electrodes, for example, by sputtering or vapor deposition. The electrodes are polarized in such a way that the electrical field strength is oriented in the same direction in all the piezoelectric ceramic disks. The stacked arrangement of several piezoelectric ceramic disks makes it possible to bring about a relatively large lift of the valve needle.

The control and analysis circuit is preferably designed as a hybrid circuit, a control and analysis chip 19 in the form of an integrated circuit (IC) being located on a support 18. The control and analysis chip is electrically connected with piezoelectric element 11 via bonded wires 20 and 21. Valve needle 10 shown only as a cutout in FIG. 2 is pressed against piezoelectric element 11 and held in contact with it by a spring not shown in the drawing, for example, a disc spring. In order to open sealing seat 5 at the start of the fuel injection phase, piezoelectric element 11 is activated in such a way that the spring force acting on valve needle 10 is overcome. During a pressure measurement phase, however, piezoelectric element 11 is acted on by the spring pressure exerted via valve needle 10 and additionally by the pressure to be measured in combustion chamber 2 of the internal combustion engine.

Of course, there are also other possibilities for the installation of piezoelectric element 11 and control analysis circuit 12. For example, the top and bottom of piezoelectric element 11 may also be contacted via contact washers in a manner similar to that already known for knock sensors.

The operating principle of fuel injector-pressure sensor combination 1 according to the present invention is as follows:

At the start of a fuel injection phase, piezoelectric element 11 is activated with an operating voltage by control and analysis circuit 12 in such a way that valve closer 3 is lifted off valve seat face 4 via valve needle 11, thus clearing sealing seat 5. If the piezoelectric crystal of piezoelectric element 11 is oriented in such a way that piezoelectric element 11 expands with the application of an operating voltage, the operating voltage is disconnected in this opened state of sealing seat 5.

In the opened state of sealing seat 5, fuel is directly injected into combustion chamber 2 of the internal combustion engine. When the quantity of fuel to be metered has been reached, sealing seat 5 is closed at the end of the fuel injection phase in that piezoelectric element 11 is subjected to sufficient operating voltage by control and analysis circuit 12 that valve closer 10 connected with piezoelectric element 11 via valve needle 10 is in tight contact with valve seat face 4. In the subsequent pressure measurement phase, piezoelectric element 11 acts as a pressure sensor. The pressure of combustion chamber 2 impinging on pressure measurement surface 6 of cylindrical section 7 of valve closer 3, in particular the combustion pressure after the ignition of the metered fuel, is applied to piezoelectric element 11 via valve needle 10. Piezoelectric element 11 converts the applied mechanical pressure into an electric voltage which is picked off at electrodes of piezoelectric element 11, which are not described in greater detail, and supplied to control and analysis circuit 12. A corresponding pressure measurement signal is available at the output of control and analysis circuit 12.

The pressure signal detected by the fuel injector-pressure sensor combination according to the present invention makes many advantageous functions possible. Thus, for example, it can be determined if the metered fuel ignites properly, i.e., if a spark plug associated with the combustion chamber functions properly in a spark-ignition engine or if the required ignition pressure is attained in a diesel engine. Furthermore, by measuring the combustion pressure in combustion chamber 2, it is possible to check if the intake and exhaust valves of combustion chamber 2 properly seal and no loss of pressure occurs due to a leak at the intake and exhaust valves or also, for example, at the cylinder head gasket.

Knocking in the internal combustion engine or misfiring can be detected early. The measured pressure signal can be converted via a suitable electronic circuit into a warning signal, for example, which is displayed to the driver of a motor vehicle in which an internal combustion engine equipped with the fuel injector-pressure sensor combination according to the present invention is installed. The measured pressure signal can also be supplied to a diagnostic system in order to detect defects in the internal combustion engine. It is particularly advantageous that in an internal combustion engine having several cylinders, a pressure signal can be measured for each cylinder without additional expense, since a conventional fuel injector is associated with each cylinder, it being possible to replace the conventional fuel injector with the fuel injector-pressure sensor combination according to the present invention. In particular, an individual knock control or misfiring recognition is possible for each cylinder of the internal combustion engine.

In this connection, the signal voltage measured at piezoelectric element 11 becomes greater the higher the pressure of combustion chamber 2 acting on pressure measurement surface 8.

In addition, the smooth running of the internal combustion engine can be measured.

What is claimed is:

1. A fuel injector-pressure sensor combination for a fuel injection system providing a direct injection of a fuel into a combustion chamber of an internal combustion engine and providing a measurement of a pressure in the combustion chamber, comprising:

an arrangement including one of a piezoelectric element and a magnetostrictive element;

a valve seat face;

a valve closer for interacting with the valve seat face in order to form a sealing seat, the valve closer including a positive connection with the one of the piezoelectric element and the magnetostrictive element; and an electronic control and analysis circuit for activating the one of the piezoelectric element and the magnetostrictive element during a fuel injection phase in such a way that the valve closer activated by the one of the piezoelectric element and the magnetostrictive element lifts off from the valve seat face and opens the sealing seat, the electronic control and analysis circuit detecting during a pressure measurement phase a pressure in the combustion chamber that is transmitted from the valve closer to the one of the piezoelectric element and the magnetostrictive element and that is converted by the one of the piezoelectric element and the magnetostrictive element into an electric signal.

2. The fuel injector-pressure sensor combination according to claim 1, wherein:

the electronic control and analysis circuit includes a hybrid circuit arranged in an immediate vicinity of the one of the piezoelectric element and the magnetostrictive element.

3. The fuel injector-pressure sensor combination according to claim 1, further comprising:

a valve needle, wherein:

the one of the piezoelectric element and the magnetostrictive element and the valve closer are connected to each other via the valve needle.

4. The fuel injector-pressure sensor combination according to claim 1, wherein:

the valve closer includes a pressure measuring surface.

5. A method of operating a fuel injector-pressure sensor combination for a fuel injection system, the fuel injector-pressure combination being provided with an electronic control and analysis circuit, one of a piezoelectric element and a magnetostrictive element, and a valve closer capable of being activated by the one of the piezoelectric element and the magnetostrictive element and interacting with a valve seat face to form a sealing seat in order to provide a direct injection of a fuel into a combustion chamber of an internal combustion engine and to provide a measurement of a pressure in the combustion chamber, the method comprising the steps of:

opening the sealing seat at a start of a fuel injection phase by causing the electronic control and analysis control circuit to apply an operating voltage to the one of the piezoelectric element and the magnetostrictive element, wherein the valve closer lifts off from the valve seat face and opens the sealing seat;

closing the sealing seat at an end of the fuel injection phase by causing the electronic control and analysis circuit to change the operating voltage for the one of the piezoelectric element and the magnetostrictive element; and causing the electronic control and analysis circuit to detect a signal voltage at the one of the piezoelectric element and the magnetostrictive element during a pressure measurement phase, wherein:

the signal voltage is induced by the pressure in the combustion chamber, and the signal voltage acts on the one of the piezoelectric element and the magnetostrictive element via the valve closer.

6. The method according to claim 5, further comprising the step of:

detecting at least one of a knocking and a misfiring of the internal combustion engine via the detection of the signal voltage on the one of the piezoelectric element and the magnetostrictive element during the pressure measurement phase.

7. The method according to claim 6, wherein:

the internal combustion engine includes a plurality of cylinders, each of which includes a fuel injector-pressure sensor combination associated therewith, and the at least one of the knocking and the misfiring is detected separately for each cylinder of the internal combustion engine.

* * * * *